March 31, 1964 H. F. MEYER 3,127,281
MEANS AND METHOD OF MAKING MULTI-TEST INDICATOR
Filed March 12, 1959 3 Sheets-Sheet 1
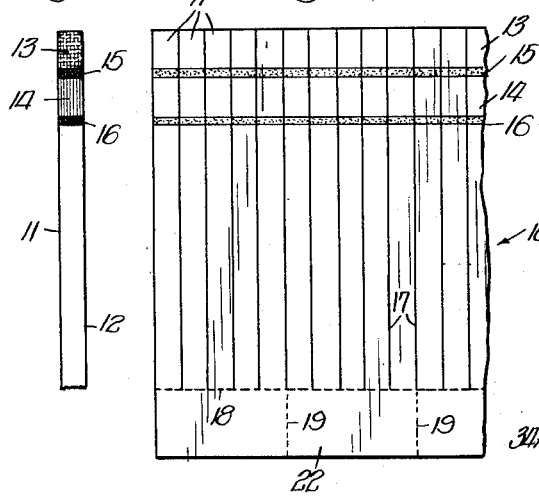
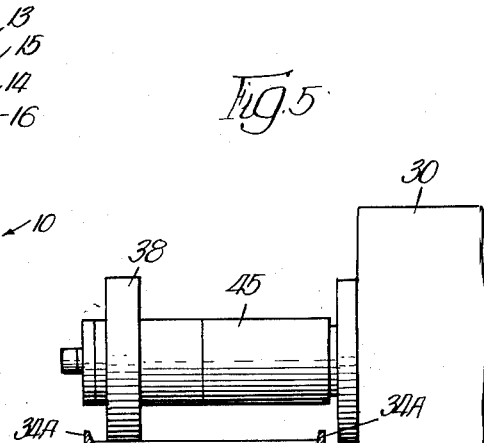
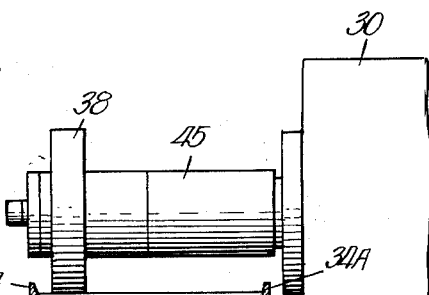
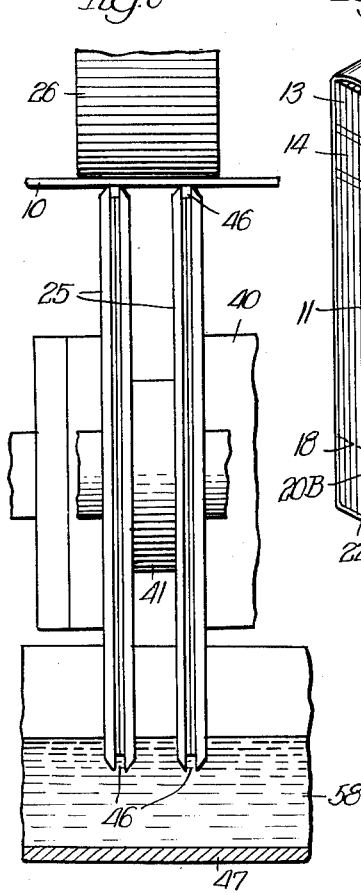
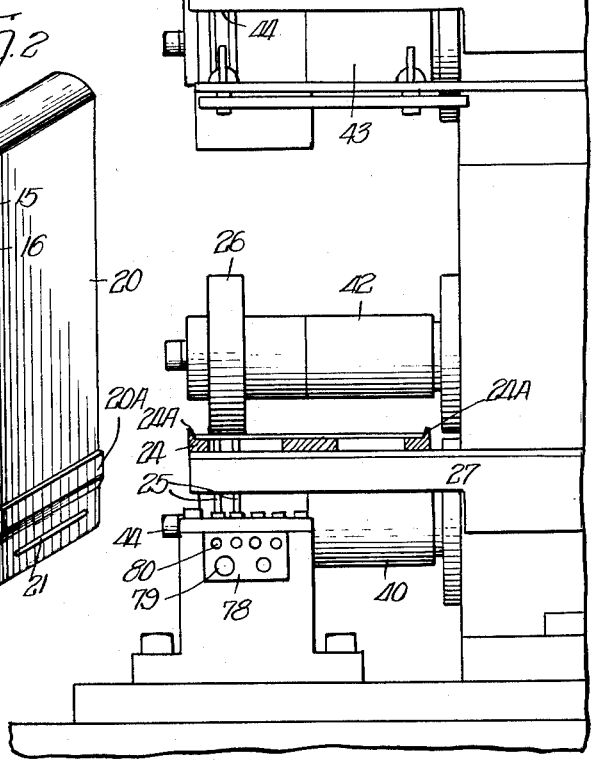
INVENTOR.
Harold Frederick Meyer,
BY

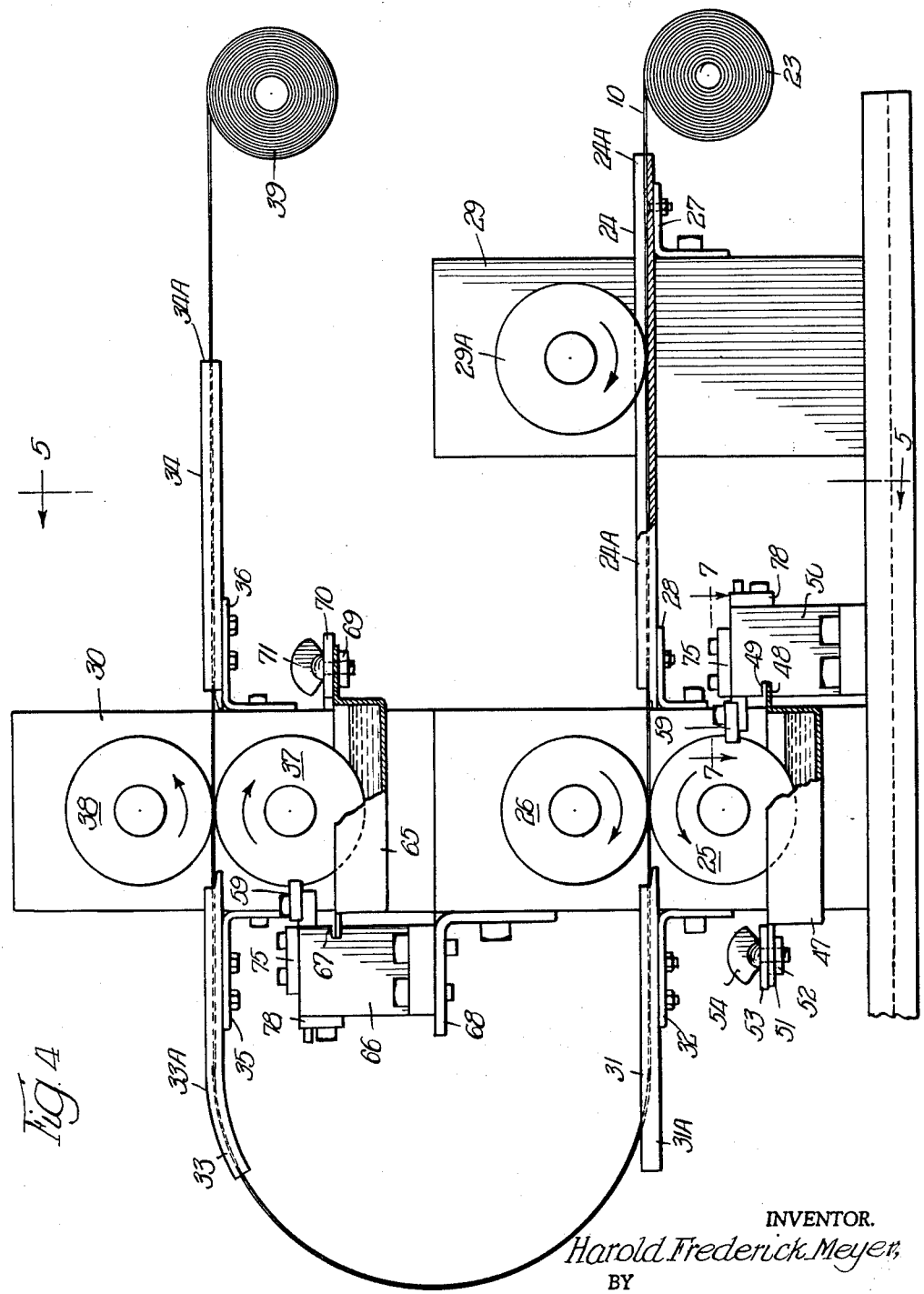

March 31, 1964 H. F. MEYER 3,127,281
MEANS AND METHOD OF MAKING MULTI-TEST INDICATOR
Filed March 12, 1959 3 Sheets-Sheet 3
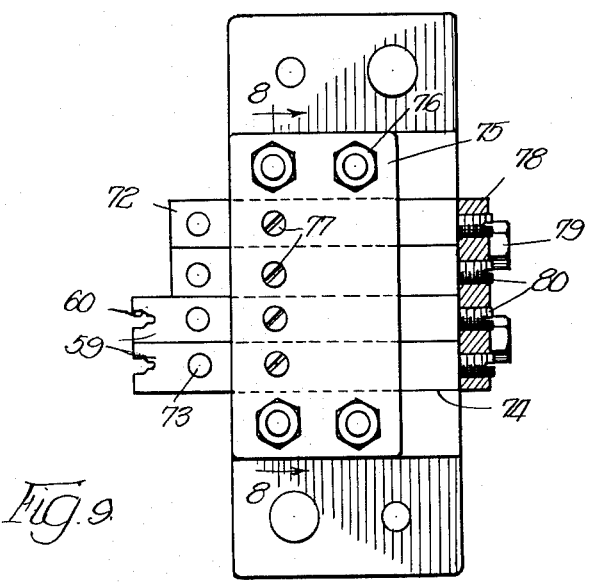
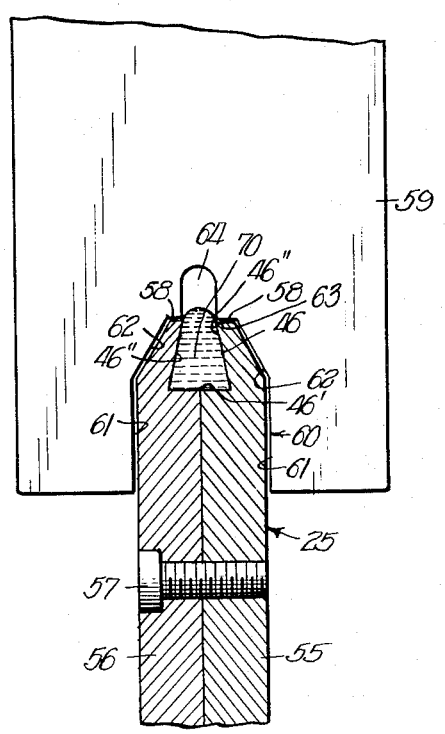
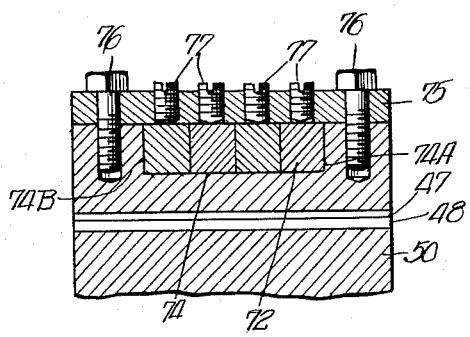
INVENTOR.
Harold Frederick Meyer,
BY United States Patent Office 3,127,281
Patented Mar. 31, 1964

3,127,281
MEANS AND METHOD OF MAKING MULTI-TEST INDICATOR
Harold Frederick Meyer, Bristol, Ind., assignor to Miles Laboratories, Inc., Elkhart, Ind., a corporation of Indiana
Filed Mar. 12, 1959, Ser. No. 798,968
13 Claims. (Cl. 117—4)

This invention relates to multi-test indicators and includes novel means and method of manufacturing the same.

Previous to my invention, it was known to use a carrier of bibulous material such as filter paper coated or impregnated with a test reagent to ascertain the presence or non-presence of a particular substance in a test specimen by dipping the coated paper into the test specimen and watching for a visible color change which the reagent would undergo if the substance were present in the test specimen. Such test indicators were used to express results in either a qualitative or quantitative manner. The latter was obtained usually by comparing the density of the new color with color samples provided on a chart.

Such indicators have been used rather extensively, for example, as a convenient means of detecting the presence of glucose or acetone bodies in a sample of urine when either there has been no time to wait for a laboratory test or the facilities for such a test were not conveniently available. However, prior to my invention, as far as I am aware, no one previously had provided such an indicator having plural coatings of different reagents so that more than one test, for example, both the glucose and acetone bodies detecting might be conducted simultaneously using the same indicator member.

Thus, a first and principal object of the present invention is to provide an indicator comprising a strip of filter paper or other fluid absorbent material coated or impregnated with two or more different test reagents whereby one might use the same indicator to conduct several different tests on the same sample of body fluid and have the results of said several tests available on a single member.

A more specific object of the invention would be to provide a multi-test indicator that would be useful for detecting simultaneously the presence of glucose and ketone bodies in a urine specimen. This I propose to accomplish by coating or impregnating selected areas of a strip of absorbent paper, for example, with two reagents, one of which will change color in the presence of a critical amount of glucose present in urine and another reagent which will change color in the presence of acetone bodies in the urine specimen. Desirably the selected reagents should be capable of reacting with the different substances in the urine or other test fluid under the same operating conditions.

In keeping with this concept, a further and more specific object of the invention is to provide a multi-test indicator of the aforedescription which may be dipped into an unheated sample of urine or other fluid to pick up a quantity of the fluid for contacting the reagent-coated or impregnated areas thereof and which reagents have the capacity to quickly enter into reaction and/or to change color in the presence of the looked-for substances without requiring heat and/or special processing of the test fluid sample.

In order to obtain the most accurate results possible from the tests and to most satisfactorily display the information obtained therefrom, it is desirable that each of the test reagents be confined in a limited area of the indicator and so that each reagent is completely isolated from the other reagent or reagents carried by the indicator. For most convenient utility of the indicator, these areas should be located in adjacent relation on one end while the other end portion of the indicator should be free of reagent and useful as a handle to manipulate the indicator. However, because of the essential absorbent character of the paper of which said indicators are formed, the solutions of test reagent as they are applied to the indicator, tend, unless restricted in some way, to flow through the entire volume of paper. Consequently, where more than one test reagent is to be applied to the indicator, there will be considerable commingling of the reagents even though they are applied to separate areas of the absorbent paper. Because a useful reading of the indicator will depend on observing color changes and/or comparing densities of color changes, such a commingling will obviously render the tests ineffective or at least difficult to read.

Thus a further object of the present invention is to provide a multi-test indicator embodying a bibulous carrier such as a strip of absorbent paper having two or more separately confined areas each impregnated with a different test reagent, as for example one which is useful to indicate the presence of acetone bodies and a second which is useful to indicate the presence of glucose in a urine specimen.

Another object of the invention is to provide means and method of applying two or more reagents to a strip of bibulous material in adjacent but completely separated and isolated relation.

Still another object of the invention is to provide novel means and method of keeping separate two or more test reagents deposited on a bibulous material in adjacent relation.

Another object of the invention is to provide means of separately confining simultaneously occurring reactions of two or more adjacently located reagents on a strip of bibulous material when the same is dipped into a test fluid for separate reactions with each of said reagents.

Still another object of the invention is to provide means and method whereby one or more barrier lines may be printed or otherwise deposited on a strip of bibulous material which will serve to confine and keep separate reagents deposited thereon to opposite sides of said line or lines.

Another object is to provide novel means and method of depositing one or more lines of barrier material on bibulous material which will function to maintain in separate spheres such simultaneously occurring reactions with test reagents deposited on the indicator to opposite sides of such a line or lines of barrier material.

Still another object of the invention is to provide means of the aforesaid utility which include one or more barrier applying wheels adapted for carrying a barrier material in fluid form from a storage area to the bibulous material and depositing the same on the bibulous material in a sharply defined clean line.

Still another object of the invention is to provide means and method of applying a sharply defined line of solution-confining material on absorbent paper or other bibulous material by contacting the same with a surface having a groove continuously filling with the fluid material.

A further object is to provide novel means and method for keeping said peripheral surface of the wheel clean of fluid so that application of the barrier line or lines is only obtained by contact of the paper with fluid from the groove.

Still another object is to provide means and method for confining the fluid absorbed by the paper from said groove so that a sharply defined line of solution-confining material will remain on drying of the fluid vehicle.

Still other and more specific objects of the invention are to provide a plural test indicator embodying a stick-like member of filter paper or other bibulous material having a handle portion and an end portion composed of two or more separately confined but adjacent areas each impregnated with a different test reagent.

A further object is to provide such a plural test indicator having barrier means for maintaining a sharp separation between each of the impregnated areas although in closely adjacent relation.

A still further object is to provide a plurality of such indicators held together at their handle portions as a unit and in a manner such that each indicator can be conveniently separated from the remaining indicators comprising said unit as needed.

Another object of the invention is to provide such an assembly of multi-test indicators in a convenient number and assembled with a cover to shield the test reagent-impregnated portions thereof.

Many other objects, advantages and/or features of the invention will be apparent, or will become so, from the description of preferred embodiments of the invention which will be described. It will further be understood that many changes and/or modifications of the parts of the described indicator or indicators and apparatus for producing the same, as well as the steps followed in the practice of the invention, may be had; and the description which follows, therefore, is not to be taken in a limiting sense but merely as illustrative of suitable forms the invention may take; what is considered to be the invention and protected by the patent being defined by the appended claims.

Now referring to the drawings wherein like parts are identified by like reference numerals:

FIGURE 1 illustrates a multi-test indicator having two different test reagents applied to adjacent confined areas of one end thereof in accordance with the invention;

FIGURE 2 shows a group of such indicators connected together as a unit and assembled with a protective cover;

FIGURE 3 is a fragmentary plan view of a strip of absorbent paper which has been processed in accordance with the invention and ready to be folded to the form and assembled with a cover as illustrated in FIG. 2;

FIGURE 4 illustrates a preferred form of apparatus for applying the barrier lines which separate and confine each of the test reagents on the indicators;

FIGURE 5 is a sectional view taken of said apparatus along lines 5—5 in FIG. 4, looking in the direction indicated by the arrows;

FIGURE 6 is an end view taken on an enlarged scale of the barrier depositing wheels and showing fragmented portions of the tank and roller which cooperate therewith in applying barrier lines to the absorbent strip;

FIGURE 7 is a top plan view of the adjustable support for the wipers used to clear the peripheral edge of the barrier wheels and is taken along lines 7—7 in FIG. 4;

FIGURE 8 is a fragmented sectional view taken along line 8—8 in said FIG. 7; and FIGURE 9 is an enlarged fragmentary view showing the grooved end of one of the barrier applying wheels and a wiper therefor.

Referring first to FIG. 1, a multi-test indicator in accordance with the present invention will comprise an elongated strip 11 of absorbent material such as filter paper or other bibulous material having a handle portion 12 constituting one end thereof. The opposite end of said indicator comprises a pair of adjacently located areas 13 and 14 each impregnated with a different test reagent and said areas 13 and 14 being isolated from each other and confined to restricted portions of the indicator strip 11 by barrier lines 15 and 16 of methylcellulose or other suitable resin which penetrate through the thickness of the strip 11 and load the paper in said linear areas sufficiently as to be solution-confining whereby test reagent applied in fluid form to one area cannot readily pass through said lines 15 or 16 to commingle with a second and separately applied reagent material or penetrate into handle portion 12. It is, of course, to be understood that any number of such restricted areas may be provided in accordance with the invention, it however also being understood that each such areas will be isolated from the other areas and also from the handle by a barrier line or lines of methylcellulose resin or other solution-confining material.

Although said areas may be impregnated or coated with any appropriate test reagents, to illustrate the invention, a multi-test indicator useful in urinalysis will be described as one form thereof. For this utility, indicator 11 has its area 13 impregnated with a test reagent useful to detect the presence of glucose in a urine specimen sample while its area 14 has been impregnated with a test reagent useful to detect the presence of ketone bodies in the same urine specimen. For this specific utility, I have found that the material disclosed in an Alfred H. Free Patent No. 2,848,-308, owned by my assignee, and comprised of the following ingredients in approximately the indicated proportions is most satisfactory as the reagent for detecting the presence of glucose.

*Example I*

| | Mg. |
|---|---|
| Orthotolidine dihydrochloride | 100 |
| Glucose oxidase | 200 |
| Peroxidase | 5 |
| Gelatine | 200 |
| A buffer composed of a mixture of anhydrous citric acid and trisodium citrate·2H$_2$O ground together in a mortar in a ratio of 31:66 by weight | 2 |
| FD and C soluble Red No. 3 | 5 |

In preparing this mixture, the gelatine is dissolved in 5 ml. of boiling water and cooled to room temperature. The 2 gm. of buffer solution is then suspended in 5 ml. of water and mixed with the gelatine to give a clear solution. The orthotolidine dihydrochloride dissolved in 5 ml. of water is then added to the mixture followed by the addition of 2.5 ml. of water containing the peroxidase and glucose oxidase and the addition of 2.5 ml. of water containing the dye. Area 14 when coated with a solution thereof and dried has a red color resulting from the particular dye utilized but turns to blue when immersed into a solution of urine containing glucose. Further details and variations in the proportions in which the aforesaid materials may be mixed and substitute ingredients are described in the aforesaid Alfred H. Free Patent No. 2,848,308 made a part hereof by reference.

Several reagents useful for detecting the presence of acetone bodies in urine are known. One such composition I have found useful is that disclosed in the Alfred H. Free Patent No. 2,509,140 also owned by my assignee. Said material which I will refer to as Example 11 comprises appropriate amounts of sodium nitroprusside, glycine and disodium phosphate which I dilute with a suitable carrier vehicle and use for impregnating area 13. This material is characterized by the fact that it has a pale yellow or brown color but when contacted by acetone bodies in a urine specimen will take on a distinctive purple color.

One of the advantages of using the aforesaid materials as the reagents with which to impregnate areas 13 and 14 is that the mentioned color change which they undergo in the presence of glucose and acetone bodies occur rapidly, within a minute or less, after the indicator has been dipped into an unheated specimen of the urine to a depth sufficient to bring the fluid into contact with both areas 13 and 14 and no peculiar processing of the urine specimen is required.

However in order to most accurately read the results of the two tests which are thus conducted simultaneously, it is important that the two reactants not be commingled in the strip and so that the reactions of each reagent with the looked-for substances in a urine specimen will remain separate and in isolation from each other. Furthermore the changes in color will be more sharp and readily seen if the reagents are uniformly and heavily concentrated through limited areas of the strip rather than being diluted through the whole volume of the indicator strip 11. Barrier lines 15 and 16 serve both these purposes. First they confine the reagent material and the reactions thereof with the urine specimen in separate isolated areas 13, 14 to prevent commingling. Secondly they make it easier to completely saturate areas 13 and 14 or otherwise control the density and/or amount of reagent applied.

Conveniently the indicators 11 are formed from a continuous strip 10 of paper or other bibulous material by feeding the strip 10 through suitable apparatus to be hereinafter more specifically described which will form the barrier lines 15 and 16 in a direction extending lengthwise thereof as shown in FIGURE 3. The strip is then cut into appropriate lengths. End 13 of each of these lengths is then dipped into the solution of Example II so as to saturate said end up to the barrier line 15 and after which the lengths are passed beneath a coating wheel (not shown) in order to saturate area 14 between lines 15 and 16 with the solution of Example I. The remainder of the strip is left clear of either solution to constitute handle 12. After drying, the lengths are cut along lines 17, perforated lengthwise along 18 and transversely along spaced lines 19. The latter perforation lines 19 provide guides along which each length may be subsequently folded to form a compact assembly of indicators 11 as indicated in FIG. 2. The thus folded sections may be enclosed within a suitable cover 20 which is stapled as at 21 and extended over and about the indicators with its opposed ends 20A and 20B tucked into the illustrated overlapping position. Thus, as needed, end 20B of cover 20 may be pulled out from beneath its other fixed end 20A and folded back to expose the indicators which may be torn along perforation 18, one at a time, from part 22. When returned to the closed position indicated in FIG. 2, the cover will serve to keep areas 13 and 14 of the unused indicators 11 clean and otherwise protected.

As seen in FIG. 4, to form barrier lines 15 and 16, strip material 10 is fed off a roll 23 and along run 24 fixed to supports 29 and 30 by brackets 27 and 28. Said run 24 is preferably formed with a divided floor and has sidewalls 24A spaced apart a distance equal to essentially the width of strip 10 so as to confine said strip against sidewise displacement in its progress toward and between grooved wheels 25, 25 and their cooperating roller 26. As seen in FIGS. 5 and 6 wheels 25, 25 are rotatably mounted on shaft 40 secured to support 30 and are separated a fixed distance apart by spacer 41. Roller 26 is rotatably mounted on a shaft 42 secured to support 30 in spaced parallel relation to shaft 40.

On the opposite side of said wheels 25 is a second run 31 also mounted by a bracket 32 to support 30 and having a divided floor and sidewalls 31A similarly spaced apart a distance equal to the width of strip 10, said run 31 having its sidewalls 31A in alignment with walls 24A of run 24 so as to cooperate therewith and guide the course of strip 10 in a fixed path between wheels 25, 25 and roller 26 whereby to control the location of lines 15 and 16 which are formed on one side thereof by said spaced wheels 25, 25 in a manner to be more specifically described below. A roller 29A of sponge rubber rotatably mounted on support 29 is also relied upon to engage strip 10 throughout its width and serves to hold the strip 10 against the run 24 and to properly tension the strip 10 as it enters between roller 26 and printing wheels 25, 25.

A second pair of runs 33 and 34 mounted by brackets 35 and 36 on opposite sides of support 30 serve to guide the strip between a second pair of grooved wheels 37, 37 and cooperating roller 38 said wheels 37, 37 being free to rotate in a clockwise direction on their shaft 43 and roller 38 in a counterclockwise direction on its shaft 45 as the strip is drawn therebetween in order to apply spaced lines of barrier material on the opposite side of the strip material 10. Said runs 33 and 34 are of construction generally similar to runs 24 and 31, run 33 having its walls 33A spaced apart a distance equal to the width of strip 10 and run 34 having similarly spaced walls 34A and which are in alignment with walls 33A of run 33. Spacer 44 corresponding to spacer 41 serves to separate wheels 37, 37 a distance corresponding to the separation of wheels 25, 25 on their shaft 40 whereby the barrier lines applied to strip 10 by wheels 37, 37 will exactly coincide with those applied by wheels 25, 25 on the opposite surface of the strip 10 as it is guided between said spaced wheels and their cooperating rollers under the confinement of said runs 33 and 34.

Strip 10 is thereafter rolled as at 39 until ready for the subsequent operations of cutting into appropriate lengths and subsequent coating or impregnating of said lengths with solutions of Examples I and II and the aforementioned operations of slitting, perforating, folding and assembling the same with covers as aforedescribed.

Referring now to FIGS. 4, 5 and 6, the mode of impressing said barrier lines by means of wheels 25, 25 and 37, 37 to opposite sides of the strip 10 will now be described. Thus a pan 47 is shown in FIGURE 4 containing solution of methylcellulose resin or other barrier producing resin which has been dissolved in an appropriate fluid vehicle and into which the lower portion of the wheels 25 extends to below the level of said fluid. Said pan 47 has one edge 48 seated in a slot 49 provided in a block 50 and has its opposed edge 51 removably secured by wing nuts 54 to between a plate 52 and bar 53 which is affixed to support 30 by bolts or the like. A pan 65 of similar fluid is also shown in said FIGURE 4 supported beneath wheels 37 in similar fashion and through which the lower portion of said wheels 37, 37 travel. For this purpose a block 66 is provided having a slot 67 in which is received one edge of the pan 65, said block 66 being mounted on a bracket 68 affixed to support 30 by a suitable means. The opposite edge of the pan 65 is removably mounted by wing nuts 71 between a clamp member 69 and a bar 70 bolted or otherwise affixed to support 30. Any other suitable means for supporting pans 47 and 65 relative to said wheels 25, 25 and 37, 37 may be employed.

Since each of wheels 25 and 37 is of essentially identical construction only one of said wheels will need to be described in detail. Turning now to FIG. 9 it will be seen that said wheels are each conveniently formed in two parts 55 and 56 secured together by appropriate means 57 and as seen in FIGS. 6 and 9 have a continuous groove 46 in their outer peripheral surface which groove has an essentially flat base wall 46' and a pair of spaced outwardly converging side walls 46''. As said wheels are rotated with the movement of the strip 10 over the upper portion thereof under the tension of roller 26 their groove 46 will pick up fluid from pan 47 transporting it into contact with the underside of the strip 10 which absorbs fluid therefrom as to form lines 15 or 16. In order to confine and otherwise limit sidewise flow of the fluid as it is absorbed by strip 10, roller 26 is caused to exert sufficient tension or pressure on the strip 10 that edges 58 of said wheels 25, 25 on opposite sides of their grooves 46 will bite into the material of strip 10 sufficiently as to channel fluid entering the paper of strip 10 and confine it against side flow. On evaporation of the solvent vehicle, the remaining resin will define a narrow sharp barrier line 15 or 16 penetrating the thickness of the strip 10.

In order to keep the grooved wheels 25, 25 and 37, 37 clean of fluid other than that confined by the groove 46 therein, flexible wipers 59 are positioned above tanks 47 and 65 and so as to be immediately ahead of the contact of each wheel with the strip 10. Thus as seen in FIG. 4 since wheel 25 is rotated in a counterclockwise direction by movement of strip 10 thereover, wiper 59 is located to the right of wheel 25 while the wiper 59 for wheels 37 which must necessarily rotate clockwise, are to the left thereof.

As seen in FIG. 9 each of said wipers 59 has a cutout 60 through which the peripheral portion of a wheel 25 or 37 passes, said cutout 60 being formed with opposed spaced parallel sides 61, inwardly converging sides 62 and transverse sides 63 which correspond essentially to the shape of the peripheral edge of the wheels 25 and 37 and function to effectively wipe the corresponding portions of the wheels with which they come into contact. Each of said cutouts 60 further has a rounded recess 64 which is located between the transverse edges 63 of said cutout 60 and which is dimensioned to be somewhat in excess of the height of the capillary bulge 70 of fluid confined within the groove 46 so that the wiper does not contact or disturb the fluid content of the groove 46.

Significantly said grooves 46 of wheels 25 and 37 are formed sufficiently narrow and by reason of their shape provide an unbroken capillary line of fluid between the tank in which the lower portion of the wheels extend and the point of contact of said wheels with the strip so that in effect the paper strip will directly absorb fluid through the groove 46 from tanks 47 or 65 as the case may be.

Preferably strip 10 is drawn across said wheels 25, 25 and likewise wheels 37,37 at a speed of about 55 feet per minute which provides a minimum contact time of any portion of the strip with the resin fluid. This further minimizes side flow of the fluid as it is absorbed by the paper from groove 46. Said speed however also has the simultaneous effect of limiting the amount of fluid which will be absorbed at any one point and therefor the depth to which the fluid will penetrate the paper. In order to obtain a complete penetration of resin through the thickness of the paper as at barrier lines 15 and 16, it is essential to apply fluid to both sides of the strip using the aforementioned wheels 37, 37 in addition to wheels 25, 25. The grooves of said wheels are however maintained in proper register by reason of the mentioned controlled spacing of said wheels relative to each other and also by the confined travel between said wheels and their cooperating roller which the runs 24, 31, 33 and 34 afford. By applying fluid from opposed sides of the strip 10 maximum penetration of the resin can be conveniently obtained and while limiting possible side flow of the resin beyond the reach of the edges 58 of the grooved wheels which are pressed into the material during the actual application or absorption of fluid from the grooves 46 of said wheels 25, 25 and 37, 37.

Referring now to FIGS. 7 and 8, details of one form of adjustable means by which the wipers 59 may be mounted on supporting block 50 are shown (it being understood that similar means are used for adjustably mounting the wipers 59 on block 66). Preferably said wipers are formed of a flexible relative inert material such as polymerized tetrafluoroethylene resin known in the trade as "Teflon" and are held in proper registration with a respective wheel 25 or 37 by supporting bars 72 to which they are secured as by means 73. As shown in said FIGURES 7 and 8, said supporting bars 72 are located in juxtaposed side by side relation in a common complementary machined recess 74 provided in support 50.

These bars 72 are of similar size and have a width such that when assembled in recess 74 four of them in side by side relation will completely fill the recess between its opposed walls 74A and 74B so as to prevent lateral shift of the wipers 59 which are shown attached to the ends of said bars 72. Although each of the bars is adapted to support a wiper 59, only two have wipers attached to their ends. Of course, if a multi-test indicator having three or even four test areas were to be formed, then a corresponding number of wheels 25 and 37 would be required to apply the additional barrier lines and one or both of the other two bars 72 would in that event have wipers mounted on their ends.

Over said recess containing the thus snugly fitting bars 74 is positioned a cover 75 secured to block 50 by bolts 76. Threadedly mounted in said cover plate 75 are set screws 77 each of which, when tightened, bears against the top surface of one of said bars 72 to secure it in a fixed position to which it has been longitudinally adjusted in said recess 74. In order to control individual adjustment of said bars 72 toward and away from a respective wheel 25 or 37 as to properly locate the cutout 60 of its attached wiper 59 about the periphery of a wheel with which it is aligned and/or to accommodate for wear of the wipers 59, a plate 78 is provided over the ends of said bars and bolted to the rear side of said block 50 by means 79 (see FIG. 5). In said plate 78 are threadedly mounted a second set of screws 80 each having an end to bear against the end of a respective wiper supporting bar 72. Thus when set screws 77 are loosened, set screws 80 may be inwardly turned to longitudinally adjust the individual bars 72 a required amount toward a wheel 25 or 37 as the case may be, so as to individually locate its wiper 59 in a new spacing relative to the periphery of said wheel. Thereafter the newly adjusted position of said bar 72 can be fixed by tightening set screw 78.

From the aforesaid description it will be apparent that all of the objects, advantages and features recited for the invention may be obtained in a convenient, simple and practical manner.

Therefore, now having described my invention, I claim:

1. The method of impregnating an absorbent sheet with a sharply defined line of liquid, comprising contacting with the desired liquid impregnant a smooth surfaced applicator member formed with a groove intermediate the width of said surface to effect filling of said groove with said liquid, wiping said smooth surface at both sides of said groove to clear said surface of said liquid while maintaining the liquid content of the groove undisturbed, and then impressing said absorbent sheet with said wiped surface to permit capillary flow of said liquid into said sheet from said groove while restricting side flow of said liquid within said sheet and without concomitant application of said liquid to said sheet from said wiped surface.

2. The method of impregnating an absorbent sheet with a sharply defined line of liquid, comprising contacting with the desired liquid impregnant the periphery of a rotary applicator member having a smooth arcuate peripheral surface formed with a circumferential groove intermediate the width thereof to effect filling of said groove with said liquid, wiping said smooth peripheral surface of said member at both sides of said groove to clear said surface of said liquid while maintaining the liquid content of the groove undisturbed, and then rollingly compressingly engaging said absorbent sheet with said wiped peripheral surface to permit capillary flow of said liquid into said sheet from said groove while restricting side flow of said liquid within said sheet and without concomitant application of said liquid to said sheet from said wiped peripheral surface.

3. A method of making multi-test indicators comprising the steps of applying a barrier line of solution confining material on opposed sides of a strip of absorbent material in coincidental relation, impregnating said strip on one side of the coincidentally printed barrier lines with a first solution of test reagent material, and impregnating said strip on the other side of said coincidentally printed barrier lines with a second solution of a different test reagent material, the said coincidentally printed barrier lines serving as means through the thickness of the absorbent material which limit penetration of said absorbent material by each solution to the side of said lines on which they are applied and thereby prevent commingling of the test reagent materials.

4. A method of making multi-test indicators, comprising the steps of applying a barrier line of solution confining material on opposite sides of a strip absorbent material in coincidental relation, applying to said strip a first test reagent material to one side of the coincidentally printed barrier lines, applying thereto a second test reagent material to the other side of said coincidentally printed barrier lines, and thereafter dividing said strip material transversely of the barrier lines into a plurality of stick-like test members.

5. A method of making multi-test indicators comprising the steps of applying resin dissolved in a readily evaporable solvent to one surface of a strip of absorbent material in spaced parallel lines extending lengthwise of the strip and inwardly of its longitudinal edges, causing the resin solution to penetrate the strip while confined against side flow, then applying further of said resin solution in spaced parallel lines on the opposed side of said strip in coincidence with the lines applied to the first surface, causing said further resin solution to penetrate the strip to the first applied resin solution while confined against side flow to produce at least two confined areas extending lengthwise of the strip and which are isolated from each other by the lines of resin left in absorbent material on evaporation of the solvent which extend through the thickness of the strip, evaporating the solvent to form said resin lines and thereafter applying one solution of test reagent to one of said confined areas, applying a second solution test reagent to another confined area, and after drying cutting said strip transversely of said resin lines to divide it into a plurality of stick-like multi-test indicator members.

6. A method of making multi-test indicators as claimed in claim 3, comprising the further step of dividing said strip material transversely of the barrier lines into a plurality of stick-like members.

7. In the method of making multi-test indicators the steps which comprise moving a strip of bibulous material across a rotatable member having its lower portion protruding into a supply of resin-containing solution in fluid form, said member having a peripherally disposed continuous groove which attracts resin-containing solution from said supply as the member is rotated, wiping the side edges of said groove to clear them of said fluid solution while maintaining the solution content of the groove itself undisturbed, maintaining the strip in contact with the resin-containing solution content of the groove so as to draw the solution therethrough from the supply, pressing the wiped side edges of the groove into the strip to confine side flow of the solution and induce deep penetration thereof into the strip, and evaporating the solvent from said solution to leave a resin-loaded barrier line in the thickness of the strip across which test reagents applied to the strip will not pass.

8. A device for applying a barrier line of resin in absorbent strip material which comprises a rotatable wheel, means for drawing absorbent strip material across a portion of the peripheral edge of said wheel in the direction in which said wheel rotates, a tank for fluid containing the resin dissolved therein through which the peripheral edge of the wheel moves as it is rotated, said peripheral edge of the wheel having a continuous circumferentially extending groove to accept fluid from said tank and apply it to the strip material at its contact therewith, and means for clearing the peripheral edge of said wheel of fluid on opposed sides of the groove ahead of its contact with the strip material, said means including a notched flexible member wherein the notch has sides corresponding to the sides of the peripheral edge of the wheel and a clearance recess over the groove whereby only fluid confined by the groove will contact the absorbent strip material.

9. A device for applying a barrier line of resin in absorbent strip material comprising a rotatable wheel over the peripheral edge of which absorbent strip material is to be drawn, a tank for fluid in which the resin is dissolved and through which the peripheral edge of the wheel moves as it is rotated, the peripheral edge of said wheel having a continuous circumferentially extending groove therein to accept fluid from said tank and apply it to the strip material on contact therewith, and wiper means for clearing the peripheral edge of said wheel of fluid on opposed sides of the groove ahead of its contact with the strip material, said wiper means including a clearance recess over the groove whereby only fluid confined by the groove will contact the absorbent strip material as it is drawn across the said peripheral edge thereof.

10. A device of the character described comprising a support, a wheel rotatably mounted on said support, a fluid containing tank disposed below said wheel and through which the lower portion of the wheel passes in its rotation, guide means by which a strip of absorbent material may be guided over the upper peripheral portion of said wheel as it is rotated, a further rotatable wheel mounted on said support and so as to urge said strip material into contact with the upper peripheral portion of said first wheel, said first wheel having a continuous circumferential extending groove in its periphery to accept fluid from said tank and apply it to the strip of material on contact therewith, and wiper means for clearing the peripheral edge of said wheel of fluid about the groove immediately ahead of its contact with the strip of absorbent material, said wiper means including a clearance recess over the groove whereby only fluid confined by the groove is applied to the said strip of absorbent material guided over said wheel.

11. A device of the character described comprising a support, a wheel rotatably mounted on said support, a fluid containing tank disposed below said wheel and through which the lower portion of the wheel passes in its rotation, guide means by which a strip of absorbent material may be guided over the upper peripheral portion of said wheel as it is rotated, a further rotatable wheel mounted on said support and so as to urge said strip material into contact with the upper peripheral portion of said first wheel, said first wheel having a continuous circumferential extending groove in its periphery to accept fluid from said tank and apply it to the strip of material on contact therewith, wiper means having a notch through which the peripheral edge of said wheel filled with fluid passes immediately ahead of its contact with the strip of absorbent material, said notch having sides for wiping the edge portions of the wheel on opposed sides of the groove and a clearance recess over the groove, and said edge portions of the wheel on opposed sides of said groove being pressed into the absorbent material by the action of said second wheel to confine side flow of the fluid as it is absorbed by the strip of absorbent material from the groove.

12. A device of the character described comprising a support, a set of spaced wheels concentrically mounted on said support for simultaneous rotation about a common axis, a fluid containing tank disposed below said wheels and through which the lower portion of each wheel passes in its rotation, guide means by which a strip of absorbent material may be guided over the upper peripheral portion of said wheels as they are rotated, a further rotatable wheel mounted on said support above said first wheels and so as to urge said strip material into contact with the upper peripheral portion of said first wheels, said first wheels each having a continuous circumferential extending groove in their periphery to accept fluid from said tank and apply it to the strip of material on contact therewith, and wiper means for clearing fluid from the peripheral edges of said wheels on opposed sides of the groove immediately ahead of their contact with the strip of absorbent material, said wiper means having a clearance recess immediately over each of the grooves, and the side edge of said grooves serving to limit side flow of fluid in the absorbent material as the fluid is absorbed thereby from the grooves.

13. A device of the character described comprising a support, two sets of similarly spaced wheels, each set concentrically mounted on the support for rotation, one above the other, fluid containing tanks disposed below each set of wheels and mounted on the support so that the lower portion of the wheels of the respective sets pass therethrough in their rotation, a further wheel cooperating with each of said sets and rotatably mounted on said support over and in alignment with each said set of spaced wheels and so as to urge a strip of absorbent material guided therebetween and its cooperating set of wheels into contact with the upper peripheral portion of said set, the wheels in said sets each having a continuous circumferentially extending groove in their periphery to accept fluid from the respective tanks and apply it to the strip of material on contact therewith, wiper means for clearing fluid from the peripheral edge of each said wheels on opposed sides of the grooves therein immediately ahead of their contact with the strip of absorbent strip material, the wiper means having a clearance recess immediately over each of the grooves, the side edges of said grooves serving to limit side flow of fluid in the absorbent strip material as the fluid is absorbed thereby from the grooves, said two sets of wheels and their cooperating further wheels serving to apply the fluid from said tanks to opposite sides of the absorbent strip material, and said device further including guide means which holds the strip of absorbent material against sidewise displacement to cause the fluid as it is absorbed by the strip material from said grooves to constitute essentially straight parallel spaced lines in essential coincidence although deposited from opposite sides of the strip material.

References Cited in the file of this patent

UNITED STATES PATENTS

| | | |
|---|---|---|
| 75,197 | Robinson | Mar. 3, 1868 |
| 267,000 | Kennedy | Nov. 7, 1882 |
| 691,249 | Dieterich | Jan. 14, 1902 |
| 855,559 | Chapin | June 4, 1907 |
| 1,112,134 | Hansing | Sept. 29, 1914 |
| 1,364,788 | Neidich | Jan. 4, 1921 |
| 1,568,605 | Hough | Jan. 5, 1926 |
| 1,756,935 | Alland | May 6, 1930 |
| 1,839,845 | Greenbaum | Jan. 5, 1932 |
| 1,881,597 | Hoyos | Oct. 11, 1932 |
| 2,129,754 | Yagoda | Sept. 13, 1938 |
| 2,164,058 | Fowler | June 27, 1939 |
| 2,476,097 | Kagen et al. | July 12, 1949 |
| 2,674,974 | Gwinn et al. | Apr. 13, 1954 |
| 2,688,567 | Franck | Sept. 7, 1954 |
| 2,785,057 | Schwab | Mar. 12, 1957 |
| 2,790,729 | Pettitt | Apr. 30, 1957 |
| 2,850,359 | Worthington | Sept. 2, 1958 |
| 2,864,725 | Sorg et al. | Dec. 16, 1958 |
| 2,879,176 | Franck | Mar. 24, 1959 |
| 3,001,915 | Fonner | Sept. 26, 1961 |

FOREIGN PATENTS

| | | |
|---|---|---|
| 822,465 | Germany | Nov. 26, 1951 |